United States Patent
Shan et al.

(10) Patent No.: US 8,249,639 B2
(45) Date of Patent: Aug. 21, 2012

(54) METHOD AND SYSTEM FOR CHARGING OF PUSH TO TALK OVER CELLULAR SERVICE AND COMMUNICATION SYSTEM

(75) Inventors: Mingjun Shan, Shenzhen (CN); Chun Li, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 468 days.

(21) Appl. No.: 12/342,989

(22) Filed: Dec. 23, 2008

(65) Prior Publication Data
US 2009/0137289 A1 May 28, 2009

Related U.S. Application Data

(63) Continuation of application No. PCT/CN2007/071328, filed on Dec. 26, 2007.

(30) Foreign Application Priority Data

Mar. 1, 2007 (CN) .......................... 2007 1 0005603

(51) Int. Cl.
*H04B 7/00* (2006.01)
*H04B 1/38* (2006.01)
*H04M 11/00* (2006.01)

(52) U.S. Cl. ........................ 455/518; 455/90.2; 455/406

(58) Field of Classification Search .................. 455/518, 455/519, 90.2, 405–406, 412.1, 413, 408; 379/114.01, 114.05; 705/35, 40
See application file for complete search history.

(56) References Cited

U.S. PATENT DOCUMENTS
2005/0215273 A1 9/2005 Ito

FOREIGN PATENT DOCUMENTS
CN 1852382 10/2006
CN 1905605 1/2007

OTHER PUBLICATIONS

3GPP TS 32.272 V6.2.0 (Dec. 2005) "3rd Generation Partnership Project; Technical Specification Group Service and System Aspects; Telecommunication management; Charging management; :ush-to-talk over Cellular (PoC) charging (Release 6)", Dec. 2005. pp. 1-44.*
Open Mobile Alliance "Push to Talk over Cellular 2 Requirements Candidate Version 2.0—Dec. 19, 2006", Dec. 2006. pp. 1-96.*

\* cited by examiner

*Primary Examiner* — Wesley Kim
(74) *Attorney, Agent, or Firm* — Brinks Hofer Gilson & Lione (57) ABSTRACT

A method for charging of the Push to Talk over Cellular, PoC, service includes: a charging system, initializing charging of a PoC session and sends a response message of PoC Box charging; monitoring a trigger condition of PoC charging according to the response message; and judge, when a PoC user joins the PoC session, whether the user participates in the session as a PoC Box, and if so, setting a PoC Box identification for the user and send charging information to the charging system so as to charge the PoC session of the user, wherein the information includes the identification. The present invention also discloses a communication system, a charging system and a PoC server. With the present invention, the accuracy of PoC charging can be significantly improved.

13 Claims, 4 Drawing Sheets

METHOD AND SYSTEM FOR CHARGING OF PUSH TO TALK OVER CELLULAR SERVICE AND COMMUNICATION SYSTEM

CROSS-REFERENCE TO RELATED APPLICATIONS

This application is a continuation of International Application No. PCT/CN2007/071328, filed on Dec. 26, 2007, which claims priority to Chinese Patent Application No. 200710005603.0, filed with the Chinese Patent Office on Mar. 1, 2007 and entitled "Method for Charging of PoC Service, Communication System, Charging System, and PoC Server", both of which are incorporated herein by reference in their entireties.

FIELD OF THE INVENTION

The present invention relates to communication technologies and in particular to a charging method and system, and specifically to a method and system for charging of the Push to Talk over Cellular, PoC, service.

BACKGROUND OF THE INVENTION

PoC service is a trunking media communication service based on the Internet Protocol, IP. The service is implemented through the bearer network with the adoption of half-duplex Voice over IP, VoIP. After the user list of a group is set, one PoC user can set up peer-to-peer or peer-to-multipeer half-duplex conversations with other PoC users.

Figure 1:
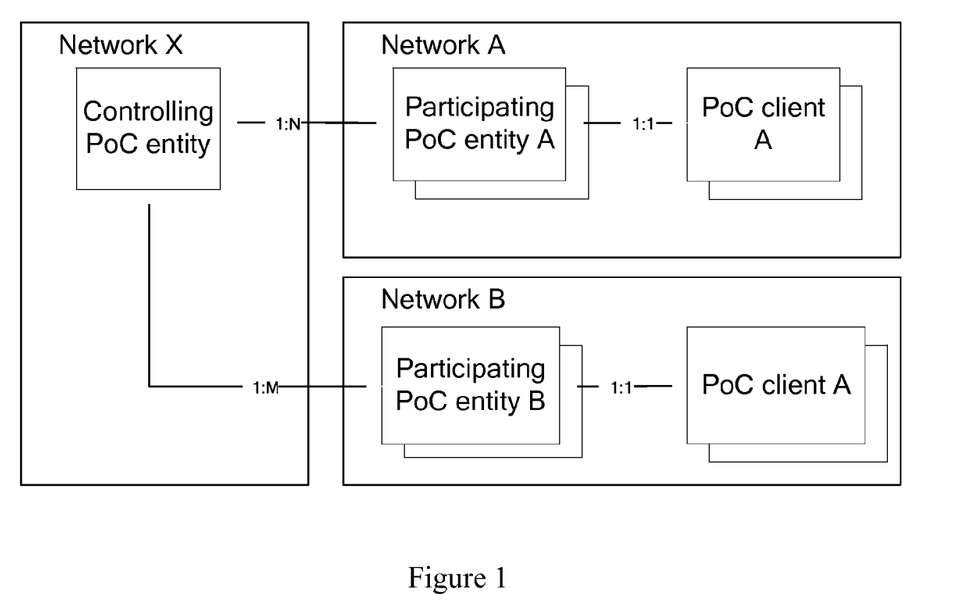
FIG. 1 shows the entity relations in a PoC network in a conventional technology.

Specific entity relations in a PoC network is shown in FIG. 1, wherein a Controlling PoC Function, CPF, is the communication core, which carries out control in a centralized way to perform session control, communication control such as establishing/canceling sessions, signaling and media negotiation, processing requests, and allocating media streams, group policies, collecting and controlling Quality of Service, QoS, parameters, and user plane adaptation.

Each client corresponds to a Participating PoC Function, PPF. All PPFs send requests to the CPF, and the CPF coordinates and controls the session processes (such as media allocation, data transfer, and authority and role transition).

Clients that join a session communicate with each other by sending requests to and receiving instructions from the CPF via PPFs. The CPF allocates media and data to PPFs according to related policies. Then PPFs forward the media and data to their corresponding clients. Thus, point-to-point and point-to-multipoint communications between clients are implemented.

CPF and PPF are functional modules. CPF and PPF may exist in one PoC server or in different PoC servers and execute different functions.

A client is the functional entity of a PoC user that joins a session. Multiple PoC users can form a PoC group.

To cater to the ongoing development of PoC application technologies, the Open Mobile Alliance, OMA, defines the PoC 2.0 specifications. Relative to PoC 1.0, the biggest change in PoC 2.0 is that PoC 2.0 supports group multimedia sessions. In addition, an entity called PoC Box is added into the PoC structure, with an intent to provide user storage space on the network side or the PoC terminal side.

According to the technology of PoC user storage space, a PoC user may have a storage space in the network, NW or the user equipment, UE to store contents including sessions and media streams, e.g. audio, video and data. The user may set a certain specific condition so as to store sessions/media that cannot be received in time into the PoC user storage space, known as a PoC Box, of the UE or NW, and the PoC Box may be set in the network party or a mobile telephone, for processing in idle time; or the user may switch between PoC client and PoC Box dynamically during a PoC session.

When the condition set by the PoC user is met, a PoC session may be stored into the storage space of the PoC Box. According to where the PoC Box is located, a PoC Box may be an NW PoC Box or a UE PoC Box.

With the addition of the feature, a new charging technology is challenged for a PoC system. In the conventional technology, a method for charging includes the following steps.

1. A number of PoC users participate in a PoC group session via a controlling PoC server;
2. The controlling PoC server receives a request, inviting a PoC Box to join the group session;
3. The controlling PoC server executes a PoC group control policy and obtains charging information of PoC group session participants according to the mode by which a normal PoC client joins a PoC group session;
4. The controlling PoC server sends the obtained charging information to the charging system; and
5. The charging system performs charging according to the charging information.

In the foregoing layout, the controlling PoC server looks the PoC Box as a normal PoC client. This is said in the charging information sent by the controlling PoC server to the charging system, the info corresponding to a PoC client and that to a PoC Box are same. However, to provide better quality service for users, it may be necessary to design a charging scheme specially for the PoC Box. The foregoing scheme performs charging according to only the number of participants and therefore accurate charging is impossible.

SUMMARY OF THE INVENTION

Embodiments of the present invention provide a method and system for charging of the Push to Talk over Cellular, PoC service and a communication system so as to improve the accuracy of charging.

A method for charging of the Push to Talk over Cellular, PoC service is provided according to an embodiment of the present invention, and includes:

receiving a response message of PoC Box charging returned by a charging system after the charging system initializes charging of a PoC session;

monitoring a trigger condition for PoC charging quest according to the response; and judging, when a PoC user joins the PoC session, whether the user participates in the session is a PoC Box mode; if the user participates in the session by the PoC Box mode, setting a PoC Box identification for the user according to the response message, and sending charging information including with the identification to the charging system, so as to charge the PoC session of the user.

A charging system is provided according to the present invention, and includes an acquisition unit, a charging initializing unit, a trigger generating unit, a sending unit, and a charging unit, where:

the acquisition unit is adapted to acquire a charging initialization request and a charging request from a Push to Talk over Cellular, PoC server;

the charging initializing unit is adapted to initialize charging of a PoC session according to the received charging initialization request;

the trigger generating unit is adapted to generate a response message for triggering PoC Box charging after the charging initializing unit completes charging initialization processing;

the sending unit is adapted to send the generated response message to the PoC server; and the charging unit is adapted to perform charging according to the charging request sent from the PoC server.

A Push to Talk over Cellular, PoC, server is provided according to the present invention, and includes: a receiving unit, a judging unit, a setting unit and a charging information sending unit, wherein:

the receiving unit is adapted to receive a response message of PoC Box charging returned by a charging system after the charging system initializes charging of a PoC session;

the judging unit is adapted to judge whether a session participation mode that a PoC user participates in the PoC session is a PoC Box mode, and if the session participation mode is the PoC Box mode, notify the setting unit according to the response message received by the receiving unit;

the setting unit is adapted to set a PoC Box identification for the PoC user according to the notification of the setting unit and send the identification to the charging information sending unit; and the charging information sending unit is adapted to send charging information including the identification to the charging system.

A communication system is provided according to the present invention, and includes a Push to Talk over Cellular, PoC, server, a charging unit, and a PoC Box.

the PoC server sends a charging initialization request to the charging unit according to a PoC session request, differentiates whether the participating mode by which the PoC user joins the session is in PoC Box mode. and if Yes, sets a PoC Box identification for the user based on the response message of PoC Box charging sent by the charging unit, and sends charging information with this identification to the charging system;

the charging unit is adapted to perform charging initialization, sends a response message for triggering PoC Box charging to the PoC server, and perform charging on the PoC session according to the charging information including the identification; and the PoC Box is adapted to join the session after an invitation.

In embodiments of the present invention, the charging system sends a PoC Box trigger conditions to the PoC server upon the initialization of charging; when the PoC server detects that a PoC Box joins the session, the PoC server judges whether the trigger condition is met and sets a PoC Box identification and sends the identification to the charging system. The charging system is able to differentiate a PoC client and a PoC Box upon acquisition of the identification so as to apply corresponding charging policies respectively. Therefore, is improved.

DETAILED DESCRIPTION OF THE INVENTION

Embodiments of the present invention provide a method for charging of PoC service, communication system, charging system and PoC server for improving the accuracy of PoC charging.

The PoC Box is a new network element entity in PoC 2.0, where a UE Box is implemented in a UE together with a PoC client. For a functional entity of the UE side, it is unnecessary to consider charging information. An NW Box, however, is a network element in the home location network of a PoC user and is an operator network resource. A PoC user is charged for using an NW Box. The PoC boxes described in embodiments of the present invention herein are all NW PoC boxes.

According to embodiments of the present invention, the accuracy of PoC charging from the following two aspects is improved. The following embodiments all assume adoption of an Online Charging System, OCS. It is understood that the method provided by embodiments of the invention is also applicable to an offline charging system with a similar procedure.

I. Differentiated Charging on PoC Client and PoC Box

Figure 2:
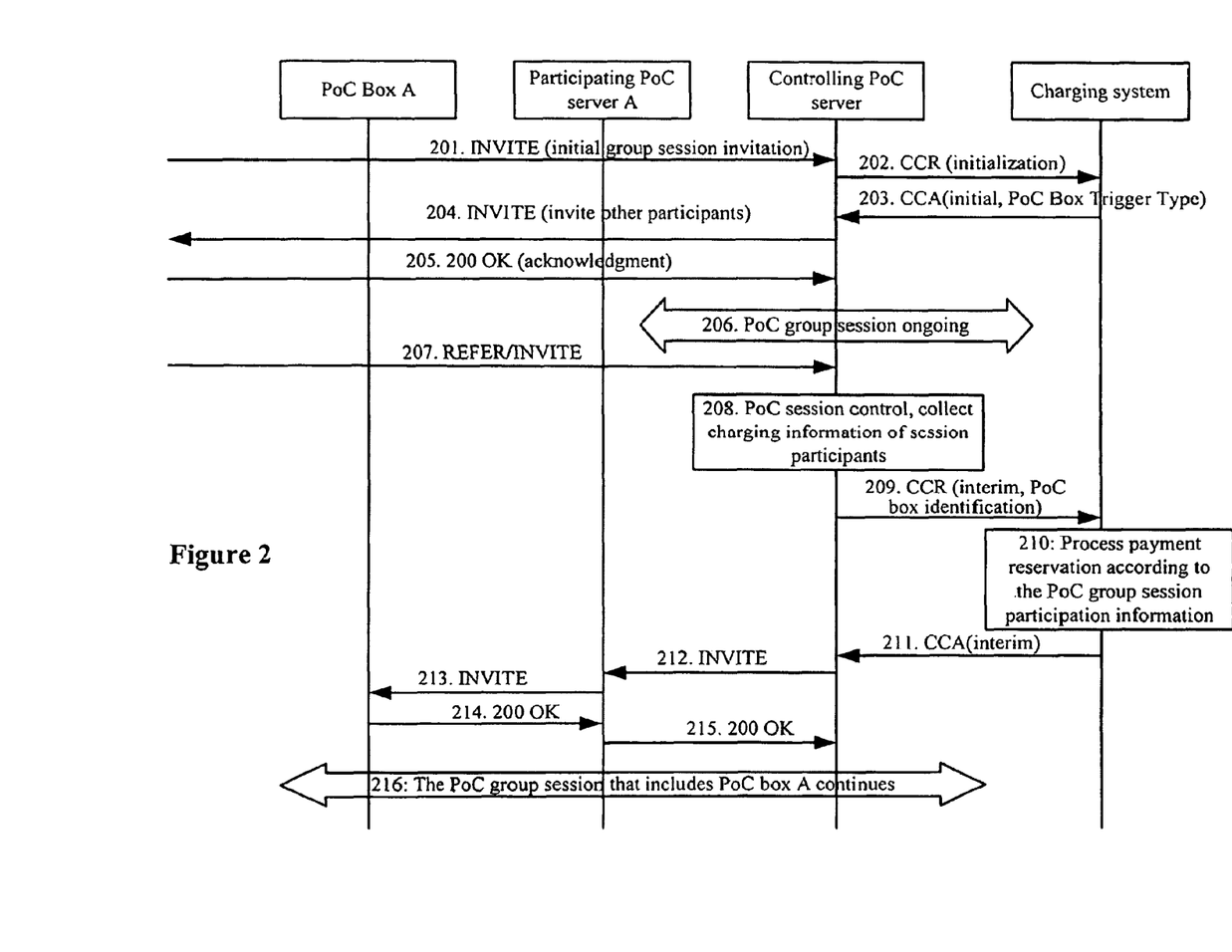
FIG. 2 shows the procedure of a method for PoC charging according to a first embodiment of the present invention.

FIG. 2 shows the procedure of a method for charging of PoC service according to a first embodiment of the present invention, including the following steps.

201: A controlling PoC server receives an Initialization INVITE request for requesting to establish a PoC group session from a session inviter.

202: The controlling PoC server sends an Initialization Credit Control Request, CCR, to an OCS, requesting reservation of payment.

203: The OCS processes the Initialization CCR and sends a Credit Control Answer, CCA, to the controlling PoC server in response to the charging processing. The CCA carries a Trigger Type parameter, i.e. PoC Box Trigger Type, which indicates that charging is needed to be implemented when a PoC Box joins the session.

The CCA carries the PoC Box Trigger Type using the following interface:

```
<CCA> ::=   < Diameter Header: 272, PXY >
            < Session-Id >
            { Result-Code }
            { Origin-Host }
            { Origin-Realm }
            { Auth-Application-Id }
            { CC-Request-Type }
            { CC-Request-Number }
            [ CC-Session-Failover ]
            [ Multiple-Services-Credit-Control ]
            [ Cost-Information]
            [ Credit-Control-Failure-Handling ]
            [ Redirect-Host]
            [ Redirect-Host-Usage ]
            [ Redirect-Max-Cache-Time ]
            [ Proxy-Info ]
            [ Route-Record ]
            [ Failed-AVP ]
            [ Service-Information ]
            [ AVP ]
```

The [Multiple-Services-Credit-Control] includes the following parameters:

```
<Multiple-Services-Credit-Control> ::=    < AVP Header: 456 >
    [ Granted-Service-Unit ]
        [ Requested-Service-Unit ]
        [ Used-Service-Unit ]
        [ Tariff-Change-Usage ]
    [ Service-Identifier ]
    [ Rating-Group ]
        [ G-S-U-Pool-Reference ]
    [ Validity-Time ]
    [ Result-Code ]
    [ Final-Unit-Indication ]
    [ Time-Quota-Threshold ]
    [ Volume-Quota-Threshold ]
    [ Unit-Quota-Threshold ]
    [ Quota-Holding-Time ]
    [ Quota-Consumption-Time ]
    [ Reporting-Reason ]
    [ Trigger-Type ]
    [ PS-Furnish-Charging-Information ]
```

In this embodiment of the present invention, the [Multiple-Services-Credit-Control] includes the following parameter:

[Trigger-Type]=PoC Box Trigger Type

This means the trigger condition is that a PoC Box joins the session. Therefore the trigger is activated when the subsequent PoC server detects a PoC Box joins the session.

In this embodiment, the CCA uses the above interface to carry the PoC Box Trigger Type parameter and it is understood that another interface or another carrying mode may be adopted so long as the PoC Box Trigger Type parameter is sent from the OCS to the controlling PoC server.

204: The controlling PoC server forwards the INVITE request to the party invited to join the PoC session.

205: The invited party sends a 200 OK response.

206: Multiple PoC users participate in the PoC group session via the controlling PoC server.

The PoC server monitors the PoC charging condition according to the received CCA by checking cyclically whether the current PoC session state meets the condition to trigger PoC Box charging.

207: The controlling PoC server receives a REFER/INVITE request that invites a PoC Box A to joint the group session. The request carries the SIP URI address of the invited party or an address list. A special identification is set when a PoC Box is invited to join the group session.

If the Controlling Server supports to invite a Box to join the PoC group session, the inviter adds the following header in the SIP INVITE request:

Accept-Contact: *;
automata; actor="msg-taker";
require;
explicit

The INVITE request is forwarded to the PoC Box A according to a service policy of the PoC server.

In the foregoing procedure, one PoC Box is invited and it is understood that, when multiple PoC boxes are invited, the same procedure is applied to each PoC Box.

208: The controlling PoC server executes a PoC group control policy and obtains information of PoC group session participants according to information that a PoC Box joins the PoC group session.

Because a PoC Box needs to join the PoC group session, the controlling PoC server determines that the charging trigger condition specified by PoC Box Trigger Type is met and triggers interim charging request information to the OCS.

209: The controlling PoC server sends a CCR, i.e. an interim charging request, to the OCS, and the CCR carries the address list of users invited to the PoC group session and the PoC Box identification. The specific PoC related charging information parameter AVP is as follows:

```
PoC-Information :: =    < AVP Header: 879>
    [ PoC-Server-Role ]
    [ PoC-Session-Type ]
    [ PoC-User-Role]
    [ Number-Of-Participants ]
        [ Participants-Involved ]
        [Participants-Group]
        [ Talk-Burst-Exchange ]
        [ PoC-Controlling-Address ]
        [ PoC-Group-Name ]
        [ PoC-Session-Id ]
        [ Charged-Party ]
    < Participants-Group > : : =   < AVP Header: 1260>
    [Called-Party-Address ]
    [Participant-Access-Priority]
    [Participant-status]
```

In this embodiment of the present invention, the Participant-status AVP included in the Participants-Group is enumerated value, specifying a PoC Box or a PoC client is accessing correctly. The PoC server informs the charging system using this parameter whether the session participant is a PoC Box or a PoC client.

210: The OCS performs charging according to the information that a PoC Box joins the session.

For example, there are five PoC users participating in an ongoing PoC group session, in which u2 (user2) and u3 (user3) are represented by PoC boxes. Then, the according charging parameters are as follows:

u1@u1.comClient
u2@u2.comNW Box
u3@u3.comNW Box
u4@u4.comClient
u5@u5.comClient

In this case, because two participants join the session by using PoC boxes, the OCS carries out payment reservation according to the charging policy applicable when a PoC Box joins a PoC session.

211: The OCS sends an interim CCA response to the controlling PoC server.

212: The controlling PoC server sends an INVITE request to a participating PoC server A.

213: The Participating PoC server A sends an INVITE request to the PoC Box A.

214: The PoC Box A sends a 200 OK response to the participating PoC server A.

215: The participating PoC server A sends a 200 OK response to the controlling PoC server.

216: The PoC group session that includes the PoC Box continues.

In the foregoing solution, because the OCS may obtain whether a PoC user is a PoC Box or a PoC client, different charging modes may be applied to different types of users so as to improve the accuracy of PoC charging.

II. Charging when a Connected PoC Client is Switched to a PoC Box

Figure 3:
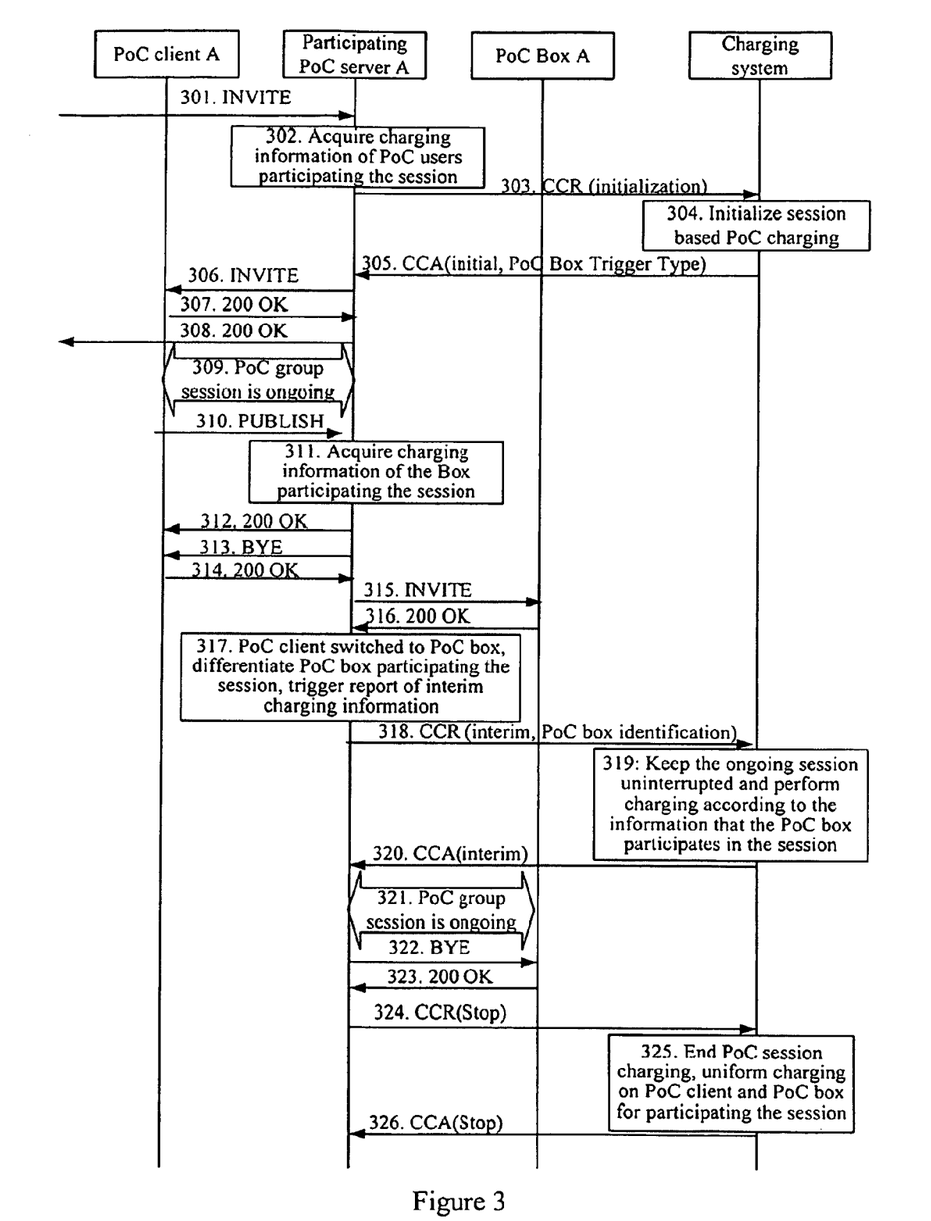
FIG. 3 shows the procedure of a method for PoC charging according to a second embodiment of the present invention.

FIG. 3 shows the procedure of a method for charging of PoC service according to a second embodiment of the present invention, including the following steps.

301: A Participating PoC server A receives an INVITE request, inviting a PoC client A to join a PoC group session.

302: The Participating PoC server A obtains charging information for inviting PoC client A to join the session.

303: The Participating PoC server A sends a CCR, i.e. charging Initialization request, specific to a PoC client to an OCS.

304: The OCS initializes session-based charging specific to the PoC client A.

305: The OCS sends a CCA charging response to the participating PoC server. The CCA charging response carries a PoC Box Trigger Type parameter which specifies charging upon joining of a PoC Box.

Here, the PoC Box Trigger Type parameter is the same as that in the PoC charging method in the first embodiment of the present invention.

306: The Participating PoC server A sends an INVITE request to the PoC client A.

307: The PoC client A sends a 200 OK response to the participating PoC server A.

308: The Participating PoC server A sends a 200 OK response to an inviter.

309: The PoC client A joins the group session and the PoC session is ongoing.

310: The PoC client A sends a PUBLISH request to the participating PoC server A, setting PoC Box switching.

311: The Participating PoC server A obtains information of setting a PoC Box to join the PoC group session.

312: The Participating PoC server A sends a 200 OK response to the PoC client A.

313: The Participating PoC server A sends a BYE request to the PoC client A.

314: The PoC client A sends a 200 OK response to the participating PoC server A and exits from the PoC session.

315: The Participating PoC server A sends an INVITE request to the PoC Box A.

316: The PoC Box A sends a 200 OK response to the participating PoC server A. The PoC Box A joins the PoC group session in the place of the PoC client A.

317: Because the PoC Box A joins the PoC group session in the place of the PoC client A, the participating PoC server A determines that the charging trigger condition specified by PoC Box Trigger Type is met and triggers interim charging request information to the OCS.

318: The Participating PoC server A sends a CCR, i.e. an interim charging request, to the OCS. The CCR carries charging information for switching between the PoC client and the PoC Box, including:

```
<CCR> ::= < Diameter Header: 272, REQ, PXY >
        < Session-Id >
        { Origin-Host }
        { Origin-Realm }
        { Destination-Realm }
        { Auth-Application-Id }
        { Service-Context-Id }
        { CC-Request-Type }
        { CC-Request-Number }
        [ Destination-Host ]
        [ User-Name ]
        [ Origin-State-Id ]
        [ Event-Timestamp ]
        [ Subscription-Id ]
        [ Termination-Cause ]
        [ Requested-Action ]
        [ Multiple-Services-Indicator ]
        [ Multiple-Services-Credit-Control ]
        [ User-Equipment-Info ]
          [ Proxy-Info ]
          [ Route-Record ]
```

```
[ Service-Information ]
[ AVP ]
```

The PoC related Service-Information is PoC-Information.

The Session-Id of the CCR is not changed so as to associate with the previous charging session where the client participates in the PoC session.

Like the first embodiment of the present invention, the PoC-Information needs to carry information that the PoC Box participates in the session.

```
PoC-Information :: =      <AVP Header: 879>
[ PoC-Server-Role ]
[ PoC-Session-Type ]
[ PoC-User-Role]
[ Number-Of-Participants ]
       [ Participants-Involved ]
       [Participants-Group]
       [ Talk-Burst-Exchange ]
       [ PoC-Controlling-Address ]
       [ PoC-Group-Name ]
       [ PoC-Session-Id ]
       [ Charged-Party ]
    < Participants-Group > : : =   < AVP Header: 1260>
[Called-Party-Address ]
[Participant-Access-Priority]
[Participant-status]
```

The Participant-status AVP is enumerated value, specifying that a PoC Box or a PoC client is accessing correctly.

319: The OCS continues the ongoing session without interruption and performs charging according to the information that the PoC Box participates in the session.

320: The OCS sends an interim CCA charging response to the participating PoC server A.

321: The PoC Box A joins the PoC group session.

322: The Participating PoC server A sends a BYE request to the PoC Box A.

323: The PoC Box A sends a 200 OK response to the participating PoC server A and exits from the PoC session.

324: The Participating PoC server A sends a CCR end charging requesting to the OCS. The CCR carries charging information that the Box uses network resources, similar to the information of step 318.

325: The OCS performs the end charging process on the information that PoC Box A joins the session and generates a uniform charging record.

326: The OCS sends a CCA end response to the participating PoC server A.

In this embodiment, the OCS sends a trigger condition to the participating PoC server. When the participating PoC server detects switching from a PoC client to a PoC Box, the participating PoC server sends a PoC Box charging request applicable to the PoC box which has a same session ID as the previous charging request applicable to the PoC client. In the switching process, there is only one session ID so as to guarantee the continuity of charging and improve the accuracy of PoC charging.

It is understood that a charging procedure upon switching from a PoC Box to a PoC client is similar to the foregoing procedure.

Those skilled in the art understand that all or part of the steps in the foregoing method may be implemented by universal computing apparatuses. They may be centralized on one computing apparatus or allocated in a network of multiple computing apparatuses. Optionally, they may be implemented by program codes that are executable by a computing apparatus so that they may be stored in a storage device and executed by a computing apparatus. Alternatively, they may be made into respective integrated circuit modules or the steps may be made into one integrated circuit module. Thus, embodiments of the invention are not limited to any specific combination of hardware and software.

Figure 4:
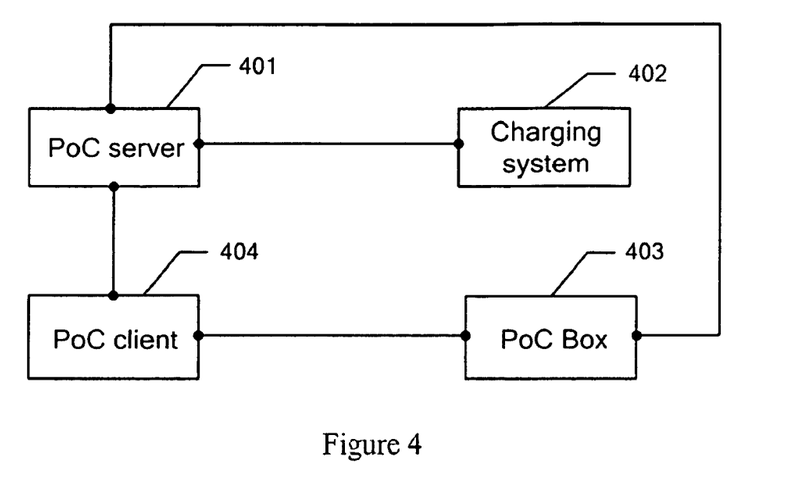
FIG. 4 shows the structure of a communication system according an embodiment of the present invention.

The following describes a communication system in an embodiment of the present invention. As shown in FIG. 4, the communication system includes:

a PoC server 401, a charging system 402, a PoC Box 403 and a PoC client 404.

The PoC server 401 sends a charging initialization request to the charging system 402 according to a received PoC session request, and judges whether the PoC user that joins a PoC session is a PoC box; if the PoC user is the PoC Box, the PoC server 401 sets a PoC Box identification for the PoC user and sends a charging request that includes the identification to the charging system 402.

The charging system 402 is adapted to perform charging initialization, send a response message for triggering PoC Box charging to the PoC server 401, and perform charging on the PoC session according to the charging information that includes the identification.

The PoC Box 403 is adapted to join a session according to an invitation.

The PoC client 404 is adapted to send a request to the PoC server 401, requesting to switch to the PoC Box 403.

The PoC server 401 may be a controlling PoC server or a participating PoC server.

The charging system 402 may be an online charging system or an offline charging system.

Figure 5:
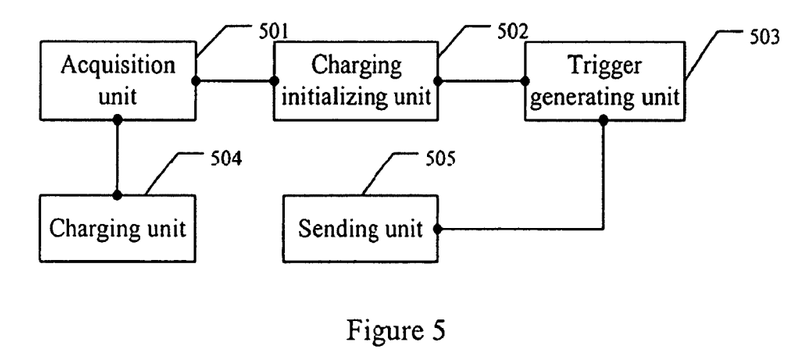
FIG. 5 shows the structure of a charging system according to an embodiment of the present invention.

The following describes a charging system in an embodiment of the present invention. As shown in FIG. 5, the charging system includes:

an acquisition unit 501, a charging initializing unit 502, a trigger generating unit 503, a sending unit 505, and a charging unit 504.

The acquisition unit 501 is adapted to acquire from a PoC server a charging initialization request and a charging request.

The charging initializing unit 502 is adapted to initialize charging of a PoC session according to the received charging initialization request.

The trigger generating unit 503 is adapted to generate a trigger message based on PoC Box charging after the charging initializing unit 502 completes charging initialization processing.

The sending unit 505 is adapted to send the generated PoC Box trigger message to the PoC server.

The charging unit 504 is adapted to perform charging according to the charging request sent from the PoC server.

Figure 6:
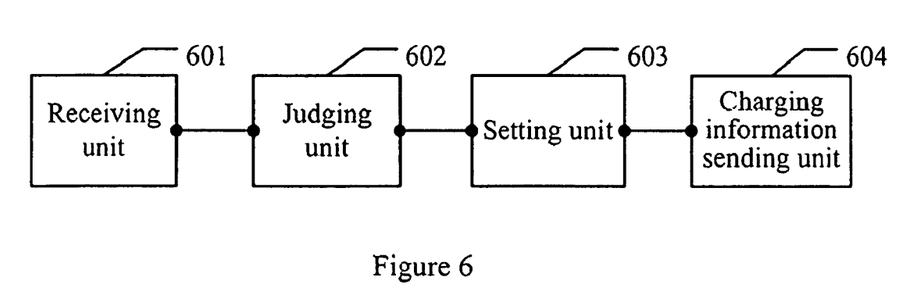
FIG. 6 shows the structure of a PoC server according to an embodiment of the present invention.

As shown in FIG. 6, a PoC server in an embodiment of the invention includes:

a receiving unit 601, a judging unit 602, a setting unit 603 and a charging information sending unit 604.

The receiving unit 601 is adapted to receive a response message of PoC Box charging returned by a charging system after the charging system initializes charging of a PoC session.

The judging unit 602 is adapted to judge whether a session participation mode that a PoC user participates in the PoC session is a PoC Box mode; if the session participation mode is the PoC Box mode, the judging unit 602 notifies the setting unit 603 according to the response message received by the receiving unit 601.

The setting unit 603 sets a PoC Box identification for the PoC user according to the notification of the setting unit 602 and sends the identification to the charging information sending unit 604.

The charging information sending unit 605 is adapted to send charging information that includes the identification to the charging system.

The above mentioned PoC server may be a controlling PoC server or a participating PoC server.

Although the invention has been described through exemplary embodiments, the invention is not limited to such embodiments. It is apparent that those skilled in the art can make various modifications and variations to the invention without departing from the spirit and scope of the invention. The invention is intended to cover the modifications and variations provided that they fall in the scope of protection defined by the claims or their equivalents.

The invention claimed is:

1. A method for charging of Push to Talk over Cellular, PoC, service, comprising:
    receiving a response message of PoC Box charging returned by a charging system after the charging system initializes charging of a PoC session during an ongoing session;
    monitoring a trigger condition of PoC charging according to the response message, wherein the trigger condition is PoC trigger type captured in CCA message; and
    judging, when a PoC user joins the PoC session, whether a session participation mode that the user participates in the session is a PoC Box mode, and if the user participates in the session by the PoC Box mode, setting a PoC Box identification for the user according to the response message, and sending charging information comprising the identification to the charging system so as to charge the PoC session of the user, wherein the charging information is sent during the ongoing session.

2. The method of claim 1, before the step of sending the charging information comprising the identification to the charging system, further comprising:
    collecting PoC session charging information; and
    adding the set identification into the charging information.

3. The method of claim 2, wherein the step of charging the PoC session comprises:
    differentiating, by the charging system, direct client participation mode and PoC Box participation mode according to the identification; and
    applying respective charging policies on users participating in client mode and PoC Box mode.

4. The method of claim 1, the method further comprising:
    sending the charging information, wherein the charging information comprises content related to current session participation mode of the PoC user, to the charging system when the PoC user joins the PoC session so as to perform charging according to the charging information.

5. The method of claim 4, after the charging system charges the PoC session according to the charging information, further comprising:
    sending, when the session participation mode of the PoC user changes, other charging information comprising charging content related to a new session participation mode to the charging system, so as to continue charging according to the other charging information;
    wherein, the charging information and the other charging information have a same session ID.

6. The method of claim 1, wherein the charging system is an online charging system or an offline charging system.

7. The method of claim 6, wherein, the step of joining the PoC session comprises:
participating in the session directly by the user, participating in the session by accessing as a network PoC Box, or participating in the session by accessing as a user equipment PoC Box.

8. A charging system, comprising:
an acquisition unit, a charging initializing unit, a trigger generating unit, a sending unit, and a charging unit, wherein:
the acquisition unit is adapted to acquire a charging initialization request and a charging request from a PoC server during an ongoing session;
the charging initializing unit is adapted to initialize charging of a PoC session according to the received charging initialization request;
the trigger generating unit is adapted to generate a response message for triggering PoC Box charging after the charging initializing unit completes charging initialization processing, wherein the trigger condition is PoC trigger type captured in CCA message;
the sending unit is adapted to send the generated response message to the PoC server, wherein the charging information is sent during the ongoing session; and
the charging unit is adapted to perform charging according to the charging request sent from the PoC server.

9. A PoC server, comprising:
a receiving unit, a judging unit, a setting unit and a charging information sending unit, wherein:
the receiving unit is adapted to receive a response message of PoC Box charging returned by a charging system after the charging system initializes charging of a PoC session during an ongoing session;
the judging unit is adapted to judge whether a session participation mode that a PoC user participates in the PoC session is a PoC Box mode, and if the session participation mode is the PoC Box mode, notify the setting unit according to the response message received by the receiving unit, wherein the notifying charging information is sent through the ongoing session;
the setting unit is adapted to set a PoC Box identification for the PoC user according to the notification of the setting unit and send the identification to the charging information sending unit; and
the charging information sending unit is adapted to send charging information comprising the identification to the charging system.

10. A communication system, comprising:
a PoC server, a charging unit and a PoC Box, wherein:
the PoC server is adapted to send a charging initialization request to the charging unit according to a received PoC session request during an ongoing session, judge whether a session participation mode by which a PoC user joins the session is in PoC Box mode, and if the user participates in the session by the PoC Box mode, set a PoC Box identification for the PoC user according to a response message of PoC Box charging sent by the charging unit, wherein the trigger condition is PoC trigger type captured in CCA message, and notify charging information comprising the identification to a charging system, wherein the notifying charging information is sent through the ongoing session;
the charging unit is adapted to perform charging initialization, send a response message for triggering the PoC Box charging to the PoC server, and perform charging on the PoC session according to the charging information comprising the identification; and
the PoC Box is adapted to join the session according to an invitation.

11. The communication system of claim 10, further comprising:
a PoC client, adapted to send a request to the PoC server, requesting to switch to the PoC Box.

12. The communication system of claim 10, wherein the PoC server is a controlling PoC server or a participating PoC server.

13. The communication system of claim 10, wherein the charging unit is an online charging system or an offline charging system.

* * * * *